Oct. 31, 1967　　W. S. HOLLOWAY　　3,349,648
ADJUSTABLE BORING TOOL
Filed June 7, 1966　　2 Sheets-Sheet 1

INVENTOR.
WILLIAM S. HOLLOWAY
BY
*Barlow & Barlow*
ATTORNEYS

Oct. 31, 1967    W. S. HOLLOWAY    3,349,648
ADJUSTABLE BORING TOOL
Filed June 7, 1966    2 Sheets-Sheet 2

INVENTOR
WILLIAM S. HOLLOWAY
BY
Barlow & Barlow
ATTORNEYS

United States Patent Office 3,349,648
Patented Oct. 31, 1967

3,349,648
ADJUSTABLE BORING TOOL
William S. Holloway, Cumberland Hill, R.I., assignor to Madison Industries, Inc., a corporation of Rhode Island
Filed June 7, 1966, Ser. No. 555,825
12 Claims. (Cl. 77—58)

This invention relates to an adjustable tool assembly which is adapted for insertion into boring bars and other cutting holders, and more particularly the invention relates to an improved micrometer adjusting tool assembly having an automatic locking characteristic, all adjustments being readily accessible from the outer face of the unit. This application is a continuation-in-part of my application Ser. No. 468,216 filed June 30, 1965, now abandoned.

In the prior art there have been many attempts at producing a tool that had adjustability. In the majority of the prior art designs, the adjustment is made from the end opposite the cutting end of the tool. This arrangement is acceptable as long as a hole passes through a tool holder, but if the tool is inserted into a dead-end hole, the cutting tool becomes difficult to adjust. Another fundamental problem exists, namely, that in any adjustable tool there are threads that are absolutely necessary to provide the adjustability and threads create a backlash between the parts of the unit which must be compensated. Additionally, the tool holder must be adequately supported in the boring bar or other holder to secure itself against the various stresses that are involved in the use thereof.

The invention has for its principal object provision of a front adjusting tool assembly which is automatically locked to the new adjusted position without the need for any separate locking screws.

Another object of the invention is the provision of an adjustable tool assembly which provides a housing for the tool body in the form of a collet which grips the tool body, which collet also permits fine adjustment of the tool body against the pressure of a spring.

According to the invention, the tool assembly comprises a collet, a tool body received by said collet, the collet embracing the tool body along its length and having screw threaded engagement therewith, whereby movement of the collet relative to the tool body will adjust the tool body longitudinally within the collet. This assembly may be received in a holder means such as a sleeve or directly into a recess in a boring bar or the like, provision being made to rotationally hold the tool body relative to the sleeve in a fixed position, or alternately the tool body is rotationally fixed with relation to the recess of the boring bar or similar piece of equipment. Since the adjustability of the tool is achieved adjacent the cutting portion thereof, that is, from the face of the tool, the recess in the boring bar or other receiving means need only be deep enough to accept the tool assembly, and in some cases, as alluded to above, may be provided with means for holding the tool body against rotative movement, or alternately a bushing may be provided to receive the assemblage, the bushing being held against rotative movement in the recess and having means to engage the tool body to prevent its rotative movement.

Preferably, the adjustable tool assembly includes a holder means containing a collet, a tool body received by said collet and having screw threaded engagement therewith and means for preventing rotation of the tool body relative to holder means, the collet and holder means having opposed abutment surfaces which are urged together by spring means to contract the collet to frictionally grip the tool body. The position of the tool body relative to the holder means is adjustable by rotating the collet and the tool assembly may then be received as a unit in the holder means which may be a bore in a boring bar or a bushing for fitment in a bore in a boring bar. The spring means preferably comprises a plurality of spring washers disposed between a shoulder of the bushing or bore in a boring bar and a retaining plate releasably secured to the tool body. The tool body may include a cylindrical portion embraced by the collet with a cutting portion at one end of the cylindrical portion and a threaded portion at the other end of the cylindrical portion. Alternately, the tool body may be formed to receive a replaceable cutting insert. In this case the tool body would still include a cylindrical portion which is embraced by the collet, but in this case the cylindrical portion would have a recess and be provided, for example, with a means for receiving a cylindrical or other shaped cutting tool insert. The means for holding the cutting tool insert in place could be a collet or other mechanical holding devices, such as set screws or the like. In this alternate form the tool body still retains the threaded portion at the end thereof remote from the part that receives the removable replaceable cutting insert.

The invention is diagrammatically illustrated in the accompanying drawings, in which.

Figure 1:
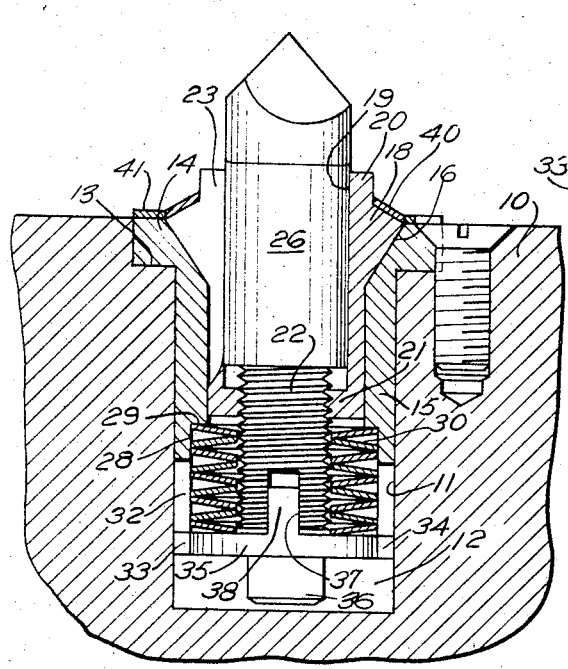
FIG. 1 is a fragmentary sectional view taken through the axis of the adjustable cutting tool as assembled and installed in a boring bar.
Figure 3:
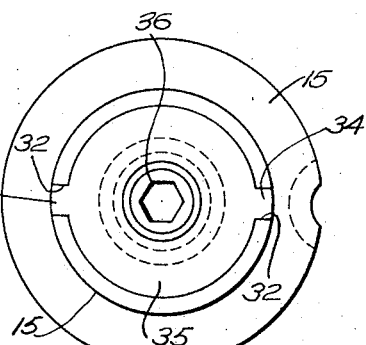
FIG. 3 is a bottom view of the tool assembly.
Figure 4:
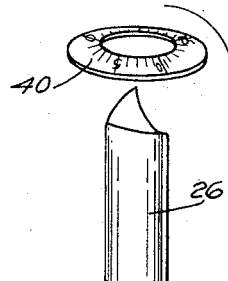
FIG. 4 is an exploded view on a reduced scale of the various component parts of the cutting tool assembly.
Figure 2:
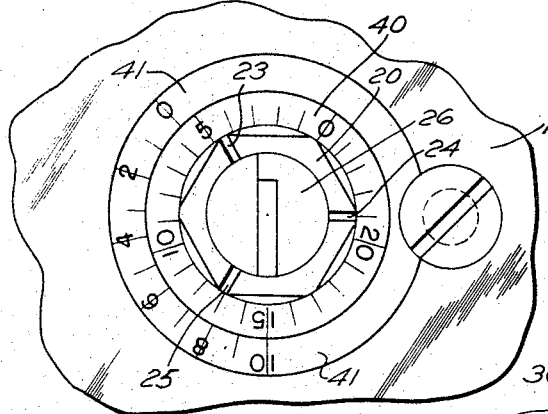
FIG. 2 is a top view of the adjustable cutting tool assembly taken on a fragmentary portion of a boring bar.

Referring to FIGURES 1 to 4, a boring bar 10 is provided with a cylindrical bore 11 which is drilled and reamed to a depth sufficient to accept the cutting tool assembly and to provide a clearance as at 12 between the tool assembly and the base of bore 11. A counterbore 13 is provided at the outer end of the bore 11, which counterbore serves as a seat for the annular rim 14 of a bushing 15 which fits within the bore 11. The bushing 15 is provided at its outer rim portion with a tapered countersunk portion 16 and a collet 18 which has a correspondingly tapered portion is received within the bore of the bushing 15. The collet member 18 is provided with a bore 19 to receive the tool body 26 and to enable the collet to be rotated relative to the boring bar 10, the outer end is in the form of an hexagonal nut 20 as shown more particularly in FIGURES 2 and 4. The inner end of the collet member is provided with an inwardly directed flange portion 21 which is threaded to engage the male threads 22 on the tool body 26. The collet is also provided with a plurality of slits 23, 24, and 25 which extend axially of the collet a substantial distance along the main bore 19 of the collet as shown more particularly in FIG. 1.

The bushing 15 is provided with a concentric counterbore 28 that supplies a shoulder 29 against which shoulder spring means consisting of a plurality of spring washers 30 may be arranged to bear. The bushing 15 is also provided with diametric slots 32 into which a pair of ears 33, 34 of a retainer disk or plate 35 are received, the retainer disk being secured to the inner end of the tool body 26 by a screw 36 and being held against rotative movement relative to the tool body by a pair of lugs 38, 39 that project inwardly from the disk 35 (see FIG. 4) into slot 37 at the end of the tool body. The spring washers serve as a spring means that react between the bushing 15 and the tool body 26 and serve to draw not only the tool body into the collet but also the collet into the bushing. In this way the collet 18 is caused to contract to grip the tool body by virtue of the engagement between the conical abutment surfaces of the bushing 15 and collet 18. The spring washers also load the threaded joint between the tool body 26 and the collet flange 21, taking up any backlash that would exist therebetween.

When it is desired to adjust the position of the tool relative to the holder, it is merely necessary to rotate the collet 18 by engaging an adjusting tool at the hex portion 20 of the collet and provide sufficient force to break the frictional engagement of the collet 18 with the tool body 26 and with the bushing 15. Rotation of the collet will axially change the position of the total body 26 relative to the collet and hence the bar 10, and by proper design of loading through the spring washers 30, the tool body 26 is locked in adjusted position sufficient force being provided, and preventing further rotation of the collet relative to the boring bar. The outer end of the collet is preferably provided with a graduated dial surface 40, and in the embodiment of FIG. 1 a vernier graduated surface 41 is fastened to the bushing 15 or graduations may be marked directly on the bushing and/or on the collet so that the axial position of the tool may be adjusted to fractions of thousandths of an inch at any time without loosening any holding screws or other means. When a separate scale means 40, 41 is used, the user may readily adapt a single tool to 53° mounts, English metric or other graduations by changing surfaces 40, 41. Further, in certain machining operations it may be desirable to have a positive rake angle or the reverse, a negative angle, and this adjustment may be readily secured by interchanging the disk 35 with another disk having a different angular attitude between lugs 38, 39 and ears 33, 34.

Figure 5:
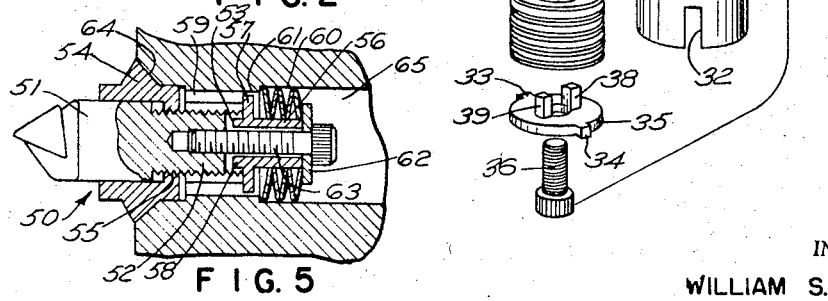
FIG. 5 is a sectional view on a reduced scale of a modified form of the adjustable cutting tool assembly shown within a boring bar.

Referring now to the embodiment of FIG. 5, it will first be noted that the necessity of providing a bushing 15 has been eliminated. In this embodiment the tool body 50 is provided with a cylindrical portion 51 and a threaded portion 52 as well as a diametric key slot 53. A collet 54 embraces the cylindrical portion 51 and has an inturned flange 55 which threadingly engages the threads on the threaded portion 52 of the tool body. A bushing 56 having radially extending ears 57 and an axially extending lug 58 is located at the end of the tool body. The ear or ears 57 engage keyways 59 provided in the bore in the boring bar, while the lug 58 engages the diametric slot 53 in the tool body 50. Suitable spring means which may be in the form of spring washers 60 surround the bushing 56 and are retained in position by a washer 62 which is held in position by the head of a screw 63 that threadingly engages a bore in the tool body 50. The washer 62 may be eliminated when the head of the screw is larger than the internal diameter of the spring washers. In this embodiment the boring bar is provided with a through bore, and this bore has at one exposed end thereof a chamfered mouth as at 64 which serves as an abutment surface for collet 54, broached key slots 59, and a counterbore 65. The collet 54 and the tool body 50 are held in the bore within the boring bar by pressure exerted by the spring means that exert a pressure between the shoulder 61 in the counterbore 65 and the end of the tool body via the washer 62 and screw 63.

It will thus be seen that in certain cases the bushing is not necessary as the tool adjusting assembly may be directly received within the suitably fashioned hole within the tool holder, access to the back of the tool assembly being necessary only when initially installing the assembly within the bore, all adjustments being made from the exposed face of the collet as in the previous embodiment.

Figure 6:
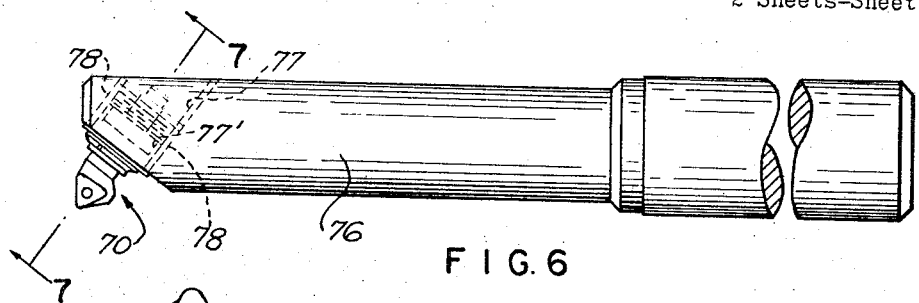
FIG. 6 is an elevational view of a modified form of adjustable tool assembly shown mounted in a boring bar.
Figure 7:
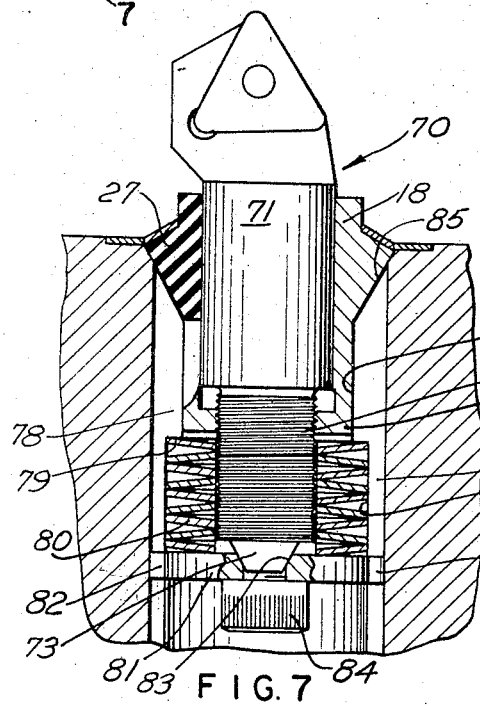
FIG. 7 is a sectional view on an enlarged scale taken on line 7—7 of FIG. 6.

In the embodiment of FIGS. 6 and 7 there is illustrated a further extension of the construction suggested in FIG. 5 where again the necessity of providing a bushing such as 15 has been eliminated. The tool body 70 is provided with a cylindrical portion 71 and a threaded portion 72 and terminates at its inner end in wedge-shaped ears 73. A collet member 18 embraces the cylindrical portion 71 and has an inwardly directed flange 21 which embraces the threaded portions 72. It will be noted that the boring bar 76 is provided at the end thereof with a bore 77 and a pair of broached or milled slots 78 that are diametrically located from each other in the bore 77. Further the bore 77 is formed with a counterbore 77' so as to create a shelf or shoulder 79. Suitable spring means which may be in the form of spring washers 80 surround the threaded portion 72 and are retained in position by a washer 81. The washer 81 has a pair of ears 82 that engage the slots 78 and a central wedge-like slot 83 which engages the ears 73. The tool body has an internally threaded bore and a screw 84 holds the washer 81 in position tightly against the tool body by the wedging action of the wedge-shaped ears 73 and wedge-shape slot 83. Thus, spring pressure is created by the spring washers 80 between the washer 81 and the shelf or shoulder 79 that is created in the boring bar. To accommodate the collet 74, the mouth of the bore 77 will be chamfered as at 85. It will be noted that this design has certain advantages over the embodiment shown in FIG. 5, the bushing 56 being eliminated as well as one counterbore in the boring bar.

Figure 8:
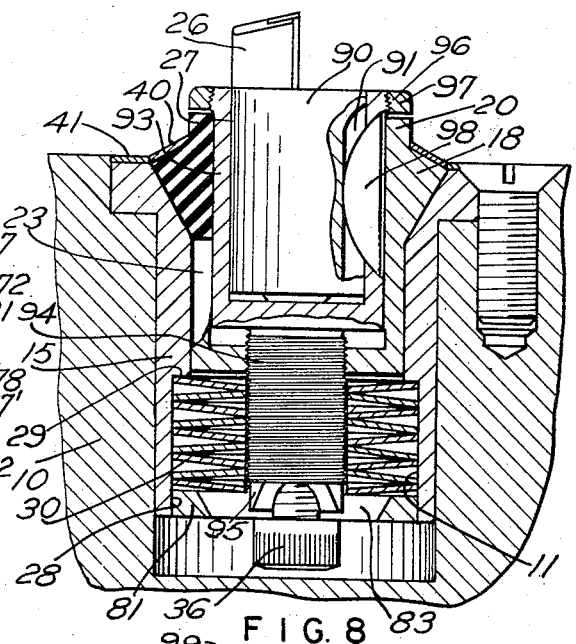
FIGS. 8 and 9 are sectional views of a modified form of adjustable tool assembly illustrated for fitment within a holder means and that includes a bushing, each view being shown at 90° to the other.
Figure 9:
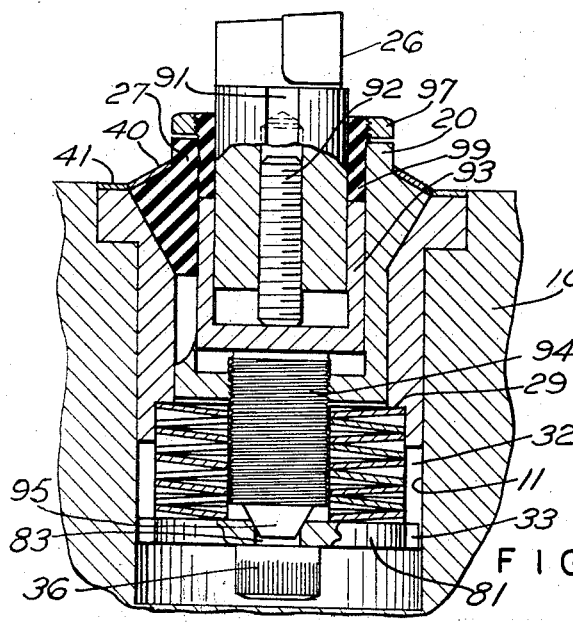
Figure 10:
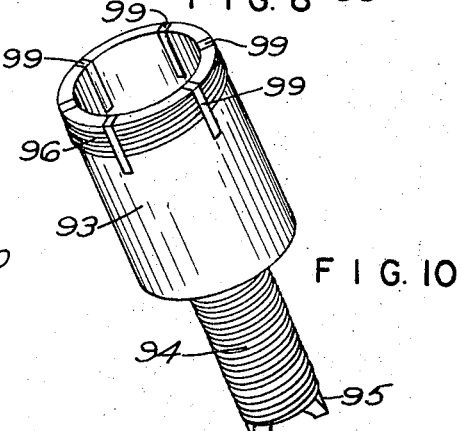
FIG. 10 is a perspective view of the modified form of tool body.

In the embodiment of FIGS. 8, 9 and 10 there is illustrated in connection with the embodiment of FIGS. 1 to 4, a variation in the construction of the tool body. Frequently it is desirable to interchange tool bits. To this end, there is illustrated a simple cylindrical tool bit 90 which is provided with a keyway 91 and is internally threaded at its end remote from the cutting tip end to receive a screw 92. This tool bit is received in a chuck as illustrated in FIG. 10 comprising a cylindrical portion 93 and a threaded stem 94 provided at its terminal end with wedge-shaped ears 95. The upper end of the cylindrical portion 93 is taper threaded as at 96 for the reception of a tightening nut 97 and a key 98 passes through the wall of the portion 93 for engagement with the slot 91. Slots 99 are provided in the upper end of the cylindrical portion 93 and are preferably filled with elastomeric compound such as is shown in section in FIG. 9. The extension of the tool bit 90 within the cylinder portion 93 can be controlled by the adjustment of the screw 92 which, as will be seen in FIG. 9, bears against the bottom wall of the cylinder 93. Thus, the tool bit may be completely received within the cylindrical portion 93 as shown in FIG. 8 or be slightly extended as shown in FIG. 9. The entire tool body now consisting of the chuck 93, 94 and the tool bit is then received in any of the structures illustrated in FIGS. 1, 5 or 7, but for purpose of illustration in FIGS. 8 and 9 it is shown as being received in a collet member 18 which in turn is received in a bushing 15. As in the previous embodiments, the tool body is held in position in this assembly by means of the spring washers 30 that bear between the shoulder 29 and a washer 81, the latter of which is held in position by a screw 36 that is received in a threaded bore in the threaded stem 94 of the chuck.

It will therefore be seen that a variety of configurations have been provided for a cutting tool assembly to take care of all machining operations.

I claim:

1. An adjustable tool assembly comprising holder means containing a collet, a tool body received by said collet, said tool body being threaded at the end opposite the cutting tip end, said collet at its inner end engaging the threads of the tool body and at its outer end embarcing the tool body, spring means acting between the holder means and the tool body, said collet and holder means having opposed abutment surfaces which are urged together by said spring means to contract the collet to frictionally grip the tool body.

2. An adjustable tool as in claim 1 wherein the spring means comprises a plurality of spring washers and a retainer plate is secured to the cutting tool body, said washers extending between the holder means and the retainer plate holding the spring washers in a compressed state.

3. An adjustable tool as in claim 1 wherein keying means are provided between the cutting tool body and the holder means to prevent relative rotation therebetween yet permitting axial movement.

4. An adjustable tool as in claim 1 wherein the tool body comprises a chuck for removably receiving tool bits.

5. An adjustable tool comprising means forming a cylindrical bore having a chamfered mouth, a collet closely fitting said bore and mouth and having an inner end providing a female threaded portion, a tool body having a cylindrical body portion and an inner end portion with male threads thereon mating with said female threaded portion, means keying said tool body to the cylindrical bore for axial movement, and spring means acting between the means forming the bore and the tool body.

6. An adjustable tool as in claim 5 wherein the means forming the cylindrical bore and chamfered mouth is an insert bushing having an external configuration to closely fit a bore in a tool holder.

7. An adjustable tool as in claim 5 wherein the tool body comprises a chuck for removably receiving tool bits.

8. An adjustable tool as in claim 5 wherein the keying means is a disk having internal lugs engaging the cutting tool body and external ears engaging a keyway in said cylindrical bore.

9. An adjustable tool as in claim 5 wherein the spring means comprises a plurality of spring washers extending beyond the inner end of the tool body and a retainer disk secured to the end of the tool body compressing the spring means.

10. An adjustable tool as in claim 5 wherein removable graduation plates are secured to the collet and the means forming the bore.

11. An adjustable tool as in claim 8 wherein the keying means is removably secured to the cutting tool body to permit substitution of variable angle lug and ear arrangements.

12. An adjustable tool assembly comprising holder means containing a collet, a tool body received by said collet, said tool body having a cylindrical portion adjacent the exposed cutting end tightly held by said collet and a threaded section from the cylindrical portion to the other end of the cutting tool body, said collet at its inner end engaging the threads of the tool body, spring means acting between the holder means and the tool body, said collet and holder means having opposed abutment surfaces which are urged together by said spring means to contract the collet to frictionally grip the tool body.

References Cited
UNITED STATES PATENTS 3,073,186   1/1963   Flannery.
3,116,653   1/1964   Lombardo.
3,232,144   2/1966   Sweeny.

WILLIAM W. DYER, Jr., *Primary Examiner.*

GERALD A. DOST, *Examiner.*